(12) United States Patent
Zaki et al.

(10) Patent No.: US 12,413,322 B2
(45) Date of Patent: Sep. 9, 2025

(54) METHOD, APPARATUS AND COMPUTER PROGRAM PRODUCT FOR LOCATING SOURCES OF POTENTIAL INTERFERENCE IN A CELLULAR RADIO COMMUNICATION SYSTEM

(71) Applicant: Vodafone Group Services Limited, Newbury (GB)

(72) Inventors: Mohamed Mahmoud Zaki, Newbury (GB); Muhammad Amin Abugabal, Newbury (GB)

(73) Assignee: Vodafone Group Services Limited, Newbury (GB)

( * ) Notice: Subject to any disclaimer, the term of this patent is extended or adjusted under 35 U.S.C. 154(b) by 54 days.

(21) Appl. No.: 18/577,467

(22) PCT Filed: Jun. 20, 2022

(86) PCT No.: PCT/GB2022/051564
§ 371 (c)(1),
(2) Date: Jan. 8, 2024

(87) PCT Pub. No.: WO2023/281239
PCT Pub. Date: Jan. 12, 2023

(65) Prior Publication Data
US 2024/0178926 A1    May 30, 2024

(30) Foreign Application Priority Data
Jul. 9, 2021 (GB) ...................... 2109959

(51) Int. Cl.
*H04B 17/345* (2015.01)
*H04W 24/08* (2009.01)
(52) U.S. Cl.
CPC .......... *H04B 17/345* (2015.01); *H04W 24/08* (2013.01)

(58) Field of Classification Search
None
See application file for complete search history.

(56) References Cited

U.S. PATENT DOCUMENTS

| 6,735,436 B1 | 5/2004 | McCauley |
| 2011/0176497 A1 | 7/2011 | Gopalakrishnan |
(Continued)

FOREIGN PATENT DOCUMENTS

EP    3176967 A1    6/2017

OTHER PUBLICATIONS

International Search Report for application No. PCT/GB2022/051564 dated Sep. 22, 2022.
(Continued)

*Primary Examiner* — Faruk Hamza
*Assistant Examiner* — Cassandra L Decker
(74) *Attorney, Agent, or Firm* — Workman Nydegger

(57) ABSTRACT

Methods, apparatuses and computer program products for locating sources of potential interference in frequency bands of carrier signals used by cells of a plurality of base stations of a cellular radio communication system are disclosed. The method comprises receiving data representative of power spectral density, PSD, in carrier signals across different frequency bands received at the base stations for cells of the communication system over time intervals. The cells are clustered based on features of the received PSD data that distinguish between a normal received signal and an abnormal received signal subject to potential interference. For each cell assigned to a cluster having features indicative of an abnormal received signal, a correlation coefficient is determined between a matrix of the signal strength values in the received PSD data for that cell in the different frequency bands over the time intervals with the signal strength values in the received PSD data for all other cells in the respective (Continued)

frequency bands over the same time intervals. Cells having correlation coefficients above a threshold value are grouped as being members of interference groups. For each interference group, the cell having the highest received power in a correlated frequency band is identified as the cell causing or nearest that cause of the interference affecting the cells in the interference group.

16 Claims, 7 Drawing Sheets

(56) References Cited

U.S. PATENT DOCUMENTS

2012/0008514 A1    1/2012    Ponnijswamy
2019/0222329 A1    7/2019    Abdelmonem

OTHER PUBLICATIONS

Written Opinion of ISR for PCT/GB2022/051564.
GB2109959.3 Search Report dated Dec. 21, 2021.
S. Wang, W. Guo and M. D. McDonnell, "Downlink interference estimation without feedback for heterogeneous network interference avoidance," 2014 21st International Conference on Telecommunications (ICT), 2014, pp. 82-87, (6 pages).

| Index | Sufficient Statistics | Description |
|---|---|---|
| S1 | Peak PSD [dBm] | The maximum received power of all PSD samples |
| S2 | Median PSD [dBm] | Median power for all PSD samples |
| S3 | Peak to median ratio [dB] | Difference between peak and median values of power spectral density |
| S4 | Minimum PSD [dBm] | The maximum received power of all PSD samples |
| S5 | Standard deviation of PSD | Standard deviation of all power spectral density samples |
| S6 | Number of spikes | Total number of spikes occurring when received PSD sample is 10 dB more than PSD median. Consecutive samples above threshold are counted once |
| S7 | Total width of spikes | Number of samples PSD samples crossing the threshold defined in S6 |

*FIGURE 6*

METHOD, APPARATUS AND COMPUTER PROGRAM PRODUCT FOR LOCATING SOURCES OF POTENTIAL INTERFERENCE IN A CELLULAR RADIO COMMUNICATION SYSTEM

This application is a 371 US Nationalization of International Application No. PCT/GB2022/051564, filed Jun. 20, 2022, which claims priority to GB Patent Application No. 2109959.3, filed Jul. 9, 2021, the disclosures of which are hereby incorporated by reference herein in their entirety.

TECHNICAL FIELD

The present application relates to locating sources of potential interference in frequency bands of carrier signals used by cells of a plurality of base stations of a cellular radio communication system. In particular, the present application provides methods, apparatuses and computer program products for identifying and locating cells causing or nearest a cause of the interference, to direct repairs and maintenance to improve the reliability of the communication system.

BACKGROUND

Demand on data traffic is increasing every day where mobile technology is playing major role on satisfying such demand. Accordingly, mobile networks are becoming increasingly complex in order to satisfy the continuous and increasing demand for connectivity, not only for human communications but also for machines, sensors, and other devices connected to the internet.

To provide wireless connectivity to support these data communications, mobile network operators assemble Radio Access Networks (RAN) of base stations such as eNodeBs providing cells of a radio communications system implementing various Radio Access Technologies (RATs), such as UMTS, LTE and 5G NR. These network providers installing these RATs rely on radio spectrum assets to provide uplink and downlink connectivity by, for example, transmitter and receiver devices encoding and decoding data onto transmissions of different radio frequency subcarriers using a suitable multiplexing method to access the radio channels, such as Orthogonal Frequency Division Multiple Access (OFDMA) or Wideband Code Division Multiple Access (WCDMA). The various RATs specify suitable communications protocols using these multiplexing methods by which base stations and multiple user communication devices in a geographic region can connect and exchange data communications.

To ensure a high availability of connectivity for users of their networks, operators seek to secure the reliable use of spectrum assets sufficient to support the demanded data traffic. For example, to satisfy the anticipated growth in traffic demand with the development of new applications, mobile network operators are deploying cells operating in the millimetre wave spectrum. Thus cells will shortly support easily more than nine concurrent different frequency bands. This provides superior capacity to serve various application and billions of devices, not only limited to handheld devices, but extends to almost every device.

A challenge arises from serving such huge amount of devices manufacturing by diverse suppliers as well as serving such various frequency bands with extended number of cells in the form of interference. Sources of interference in the radio spectrum assets can come, for example, from a fault in the mobile network equipment itself, or from a device, such as a user-installed relay, radio transceiver, a satellite receiver, or a military radio source, provided in the geographic region of the network transmitting signals in the radio spectrum that interfere with normal radio communications. Such interference sources will cause high impact on other users and base stations in their ability to receive and correctly decode signals above the interference noise. This can affect both downlink (Base station to user) and uplink (user to base station) channels. However, the effect of interference is more severe in uplink where mobile device power is limited, and the base station uses sensitive receivers in order to be able to decode the users' signals. Typically, a relatively high received power in base station indicates the reception of undesired interfered signal. However, there are challenges for mobile network operators with identifying and locating the sources of interference within their network, with field engineers typically being deployed to search for them using field equipment such as a spectrum analyser. This can take a significant amount of time before a source of interference is identified, located, and addressed, during which data communication in the network is disrupted.

It is in the above context that the present disclosure has been devised.

SUMMARY OF THE DISCLOSURE

Viewed from one aspect, the present disclosure provides a method for locating sources of potential interference in frequency bands of carrier signals used by cells of a plurality of base stations of a cellular radio communication system, the method comprising: receiving data and/or receiving interference representative of power spectral density, PSD, in carrier signals across different frequency bands received at the base stations for cells of the communication system over time intervals; clustering cells based on features of the received PSD data that distinguish between a normal received signal and an abnormal received signal subject to potential interference; for each cell assigned to a cluster having features indicative of an abnormal received signal, determining a correlation coefficient between a matrix of the signal strength values in the received PSD data for that cell in the different frequency bands over the time intervals with the signal strength values in the received PSD data for all other cells in the respective frequency bands over the same time intervals; grouping cells having correlation coefficients above a threshold value as being members of interference groups; for each interference group, identifying the cell having the highest received power in a correlated frequency band as the cell causing or nearest that cause of the interference affecting the cells in the interference group.

Viewed from another aspect, the present disclosure provides apparatus for locating sources of potential interference in carrier frequency bands used by cells of a plurality of base stations of a cellular radio communication system, the apparatus comprising: one or more processors; memory comprising instructions which when executed configure the processors to: receive data representative of power spectral density, PSD, in carrier signals across different frequency bands received at the base stations for cells of the communication system over time intervals; cluster cells based on features of the received PSD data that distinguish between a normal received signal and an abnormal received signal subject to potential interference; for each cell assigned to a cluster having features indicative of an abnormal received signal, determine a correlation coefficient between a matrix of the signal strength values in the received PSD data for that cell in the different frequency bands over the time intervals with the signal strength values in the received PSD data for all other cells in the respective frequency bands over the same time intervals; group cells having correlation coefficients above a threshold value as being members of interference groups; for each interference group, identify the cell having the highest received power in a correlated frequency band as the cell causing or nearest that cause of the interference affecting the cells in the interference group.

Viewed from another aspect, the present disclosure provides a computer program product comprising instructions which when executed by one or more processors, configure the processors to receive data representative of power spectral density, PSD, in carrier signals across different frequency bands received at the base stations for cells of the communication system over time intervals; cluster cells based on features of the received PSD data that distinguish between a normal received signal and an abnormal received signal subject to potential interference; for each cell assigned to a cluster having features indicative of an abnormal received signal, determine a correlation coefficient between a matrix of the signal strength values in the received PSD data for that cell in the different frequency bands over the time intervals with the signal strength values in the received PSD data for all other cells in the respective frequency bands over the same time intervals; group cells having correlation coefficients above a threshold value as being members of interference groups; for each interference group, identify the cell having the highest received power in a correlated frequency band as the cell causing or nearest that cause of the interference affecting the cells in the interference group.

Methods, apparatuses, and computer program products in accordance with the above aspects of the present disclosure allow sources of interference affecting one or more cells in a cellular radio communication system to be easily and automatically detected, and through the use of clustering and correlation, the sources can be easily located, facilitating guided repairs and field visits together with identifying the potential type of device causing interference. This more accurately detects interference and allows the sources to be addressed, improving the reliability and throughput of connectivity between users and devices and the cellular radio communication system serving them. The correlation of the PSD data for cells in clusters having features indicative of an abnormal received signal allows cells likely affected by the same interference source to be identified and allocated to the same interference group. Analysis of the features of the PSD data within these groups, such as the cell having the highest received power in a correlated frequency band, can be identified as the cell causing or nearest the cause of the interference. This allows the source of the interference potentially affecting a large number of cells to be identified and better localised, allowing it to be addressed and removed.

Absent the present disclosure, the approaches used to detect interference in current mobile networks are rather inaccurate, time consuming or costly. For example, where an interference source leads to uplink or downlink connectivity problems in multiple cells, each cell has an error reported and separately investigated. Where the source of the interference is remote from any particular cell being investigated, the search for the interference source and be difficult and unsuccessful. For example, current approaches involve the detection of high received power in suspected cells (looking at total received power, not at power spectral density), with a field survey then being performed using a spectrum analyser trying to localize a source of interference. This method typically requires locking the cells in the entire region in an attempt to isolate intrinsic interference. The success rate with this approach can be very low with extended efforts in the field.

The present disclosure provides a more full and accurate solution for early and efficient interference source identification and localisation, applicable to a range of different radio access technologies. In particular, the approach of the present disclosure utilises large amounts of data produced by cellular receivers to identify candidate cells having abnormal received power signals and then seeks to identify the relationship between the PSD data of different cells to find cells with a correlated interference signal, which are typically found to be near each other when assigned to an interference group. Further, the analysis within these interference groups allows the cell to be identified that is causing or nearest that cause of the interference affecting the cells in the interference group.

While this approach is works for received signals at cellular base stations for uplink channels, the use of time division duplexing (TDD) makes it applicable also for downlink.

In embodiments, the features of the received PSD data used to cluster the cells includes one or more of: raw data representative of the PSD for the cells; features extracted as values derived from the raw data representative of the PSD for the cells; key performance indicators provided by the cells; topology information for the cells; location information for the cells; orientation information for the cells; radio access technology, RAT, used by the cells; and radio resource allocation for the cells.

In embodiments, the data representative of the Power Spectral Density is PSD data of received power across different frequency bands of the base station. In examples, this may be raw PSD data provided by a base station, such as a UMTS-compliant eNodeB in a 3G RAT, or it may be similar data providing the same information, such as Received Interference Power (RIP) or Received Signal Strength Indicator (RSSI) provided per frequency band by an LTE-compliant eNodeB in a 4G RAT. In other embodiments, the raw PSD data may be generated by post-processing data provided by the base stations.

In embodiments, the data may represent the PSD or equivalent information in frequency bands for individual subcarriers in a multiplexing system, or for groups of subcarriers, such as, in an LTE RAT system, for 180 kHz radio resource blocks of twelve 15 kHz subcarriers.

In embodiments, the data for the analysis is that collected over a long period, such as over a number of days. In examples, the data may be aggregated for at least four days, a snapshot or average of the raw PSD data and the data used to provide other features being taken every hour, giving, in the example, 96 records in total. Any group of cells allocated to an abnormal cluster and having PSD data sufficiently correlating over this period group such that the correlation threshold is exceeded will be allocated to an interference group.

In embodiments, the features of the received PSD data used to cluster the cells are selected to characterise differences in the received PSD data and a normal received signal subject to potential interference to sufficiently generate clusters of cells in the resulting feature space that are identified as abnormal due to interference signals.

The use of these data sources, in particular the raw data representative of the PSD and features extracted therefrom, allows the unsupervised clustering to sufficiently cluster cells having abnormal received signal due to potential interference. In this regard, the features may be engineered to select features from the dataset, or process the dataset, such as the raw PSD data, to derive values for extracted features, the raw or extracted features being selected to ensure that abnormalities in received PSD data are sufficiently described to allow their detection and partitioning through clustering.

In embodiments, the clustering of the cells comprises performing a hierarchical clustering on the features of the received PSD data plotted in the feature space.

In embodiments, the clustering of the cells comprises applying an image recognition algorithm to spectrograms representative of the received raw data representative of the PSD for the cells over time. In embodiments, the image recognition algorithm is a neural network and wherein the clustering of the cells further comprises applying a clustering algorithm to a values extracted from a hidden layer of the neural network providing the image recognition algorithm.

In this way, using the raw PSD data to construct a spectrogram allows image recognition algorithms to be used in the clustering to aid the identification of cells experiencing interference and their allocation to abnormal clusters to be performed based on patterns in the raw data which may not be recognised or expressed in features selected or extracted from the raw data, which can help ensure that all cells affected by interference are identified and clustered.

In embodiments, the clustering of the cells comprises a first clustering step and a second clustering step, wherein the applying of an image recognition algorithm to spectrograms representative of the received raw data representative of the PSD for the cells over time is performed for the second clustering step. The first clustering step may include clustering based on features extracted as values derived from the raw data representative of the PSD for the cells. In this way, using a two-step clustering approach allows a first step to first identify broader clusters of abnormal cells, which may reduce down the amount of data that can then be subject to a second, more computationally intensive image-based clustering step to separate out the abnormal cells into clusters suffering different causes of interference. This permits a computationally efficient approach to identifying and locating sources of potential interference.

In embodiments, the method further comprises identifying clusters of cells having features indicative of an abnormal received signal by: comparing one or more of: key performance indicators provided by the cells in the cluster; and mean values of features extracted as values derived from the raw data representative of the PSD for the cells in the cluster; with one or more of: key performance indicators for cells within the bounds of normal operation; values of features representative of the PSD for a normal received signal for the cells in the cluster.

In this way, features selected and extracted from the raw data, and KPIs indicative of performance of the cells, can be used to quickly and efficiently cluster the cells, effectively partitioning off cells affected by interference into clusters of cells identified as having an abnormal received signal.

In embodiments, the method further comprises: receiving interference cause label data for interference groups resulting from a field visit to identify the cause of the interference; and performing supervised machine learning to train an interference cause classifier by using an optimisation algorithm to seek to minimise a loss function characterising an error between input labelled causes and output classified causes for training data comprising features of the received PSD data for cells in an interference group.

In embodiments, the method further comprises: using a trained interference cause classifier to classify, based on received PSD data for cells in a newly clustered, non-labelled interference group, the likely cause of interference in the cells of the interference group.

In embodiments, the method further comprises, for each interference group, outputting data representative of the cell identified as containing the cause of the interference group, for guiding targeted field visits to those cells.

In this way, the receipt of data indicative of the cause of the interference (e.g. passive intermodulation (PIM), faulty repeater, etc) allows labelling of the data for the cells of the affected interference group, which then allows a supervised learning approach to train an artificially intelligent classifier to assign, at runtime, a classification to the cause of the interference for newly detected interference groups. This facilitates the identification of the cause of the interference, as well as its location, which may allow the repair to remove the interference to be conducted quickly or even remotely, without requiring a field engineer to visit the cell at all.

In embodiments, the determination of a correlation coefficient for each cell assigned to a cluster having features indicative of an abnormal received signal correlates only other cells assigned to abnormal clusters within a threshold distance or geographic region of the cell. This helps ensure that, over a wide area, cells remote from each other yet experiencing similar interference in the same frequency bands over the same time period in the data, but from separate interference sources, are not inadvertently correlated with each other and placed into the same interference group. Further, limiting the correlation between the raw PSD data of cells to only those cells local to the cell in question such that they may be capable of also experiencing interference from the same source, the amount of computation to evaluate cell correlations and identify interference groups among the cells in the network is significantly reduced.

In embodiments, for cells having multi-element antenna arrays supporting determination of the angle of arrival of received signals, the method further comprises receiving the PSD data and angle of arrival split for each receive beam, and for cells allocated to abnormal clusters and identified as causing or containing the cause of the interference, using the split PSD data to identify the receive beam causing the interference, and using the angle of arrival to identify the direction from which the interference is originating. Using PSD data differentiated between the receive beams, together with the computed receive angles for the receive beams, allows the further localisation and finding of the interference source in the cells identified as causing or containing the cause of the interference. In embodiments, the cells having multi-element antenna arrays may be provided by base stations that support Multiple-Input Multiple Output, MIMO, in their radio access technology.

In embodiments, for interference groups containing only a single cell, the cause of the interference is deemed to be a fault within the receiver elements at the cell that is not propagating to other cells in the network.

It will be appreciated from the foregoing disclosure and the following detailed description of the examples that certain features and implementations described as being optional in relation to any given aspect of the disclosure set out above should be understood by the reader as being disclosed also in combination with the other aspects of the present disclosure, where applicable. Similarly, it will be appreciated that any attendant advantages described in relation to any given aspect of the disclosure set out above should be understood by the reader as being disclosed as advantages of the other aspects of the present disclosure, where applicable. That is, the description of optional features and advantages in relation to a specific aspect of the disclosure above is not limiting, and it should be understood that the disclosures of these optional features and advantages are intended to relate to all aspects of the disclosure in combination, where such combination is applicable.

BRIEF DESCRIPTION OF THE DRAWINGS

Examples of the present disclosure are further described hereinafter with reference to the accompanying drawings, in which:

FIG. 6 shows an example table of features taken from raw PSD or derived therefrom using feature extraction and selected to ensure that abnormalities in received PSD data are sufficiently described to allow their detection and partitioning through clustering.

DETAILED DESCRIPTION

Figure 1:
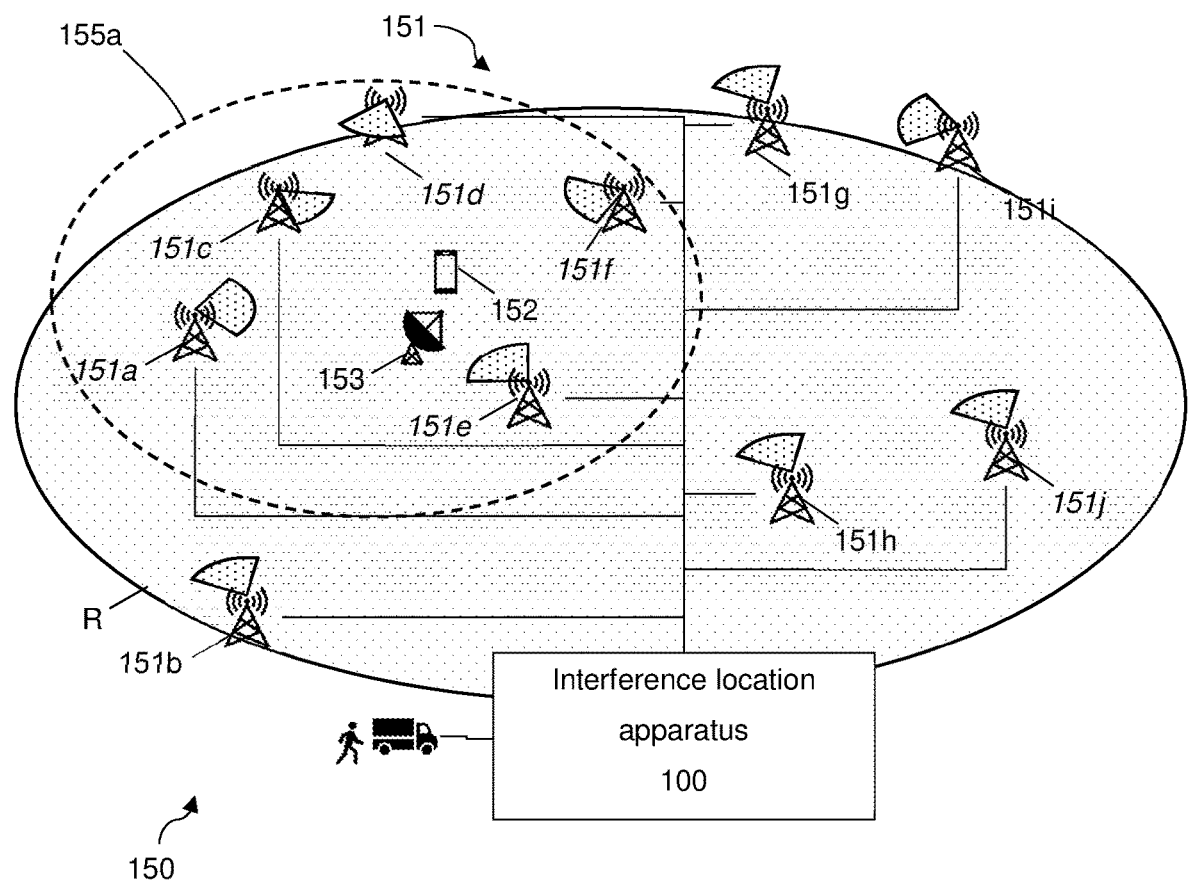
FIG. 1 shows a cellular radio communication system and an interference location apparatus coupled to base stations of the communication system and for locating sources of potential interference in frequency bands of carrier signals used by cells provided by the base stations in accordance with examples of the present disclosure.

Hereinafter, embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Referring now to the drawings, FIG. 1 shows a cellular radio communication system 150 which includes a Radio Access Network (RAN) 151 comprising plural base stations 151*a*, 151*b*, 151*c*, 151*d*, 151*e*, 151*f*, 151*g*, 151*h*, 151*i*, 151*j* . . . 151*n* arranged at different locations throughout a geographic region R in order to provide cellular radio coverage to allow user devices 152 (or other connected devices, such as Internet of Things devices) to connect to the cellular radio communication system 150 through base stations of the RAN 151 using a compatible Radio Access Technology (RAT) supported by the base stations. The cell coverage for each base station 151*a* . . . 151*j* is illustrated in FIG. 1 with the directed sector circles.

By connecting through the RAN 151, the user device 152 may be allocated radio resources in the form of resource blocks comprising plural subcarriers by which the user device 152 can transmit, at specific allocated symbol timings, OFDMA encoded symbols to the base station of the RAN 151 to which it is connected. In the example shown, the user device 152 is trying to communicate in an RRC Connected state with the nearest base station 151e. However, an interference source 153 (in this case a satellite receiver) has been activated in the region R near the cell 151e, and it is generating interference in frequency bands that can be allocated as radio resources by the base stations of the RAN 151. This raises the noise floor, causing significant errors in the detection of the symbols encoded on the relatively weak modulated signals transmitted by user devices allocated radio resources in the frequency bands suffering from interference. This interference and noise leads to high error rates in the uplink channel, limiting cellular connectivity for user devices 152 near the interference source 153 and bandwidth overall.

To allow early detection and localisation of interference sources in the region R of the RAN 151, each of the base stations 151a . . . 151j is connected to an interference location apparatus 100 in accordance with aspects of the present disclosure. The data connections between the base stations 151a . . . 151j and interference location apparatus 100 are shown schematically in FIG. 1 by direct solid lines, but the connections may be any suitable connection, such as reporting to the interference location apparatus 100 over the Internet through the core network (not shown) of the communication system 150.

Figure 2:
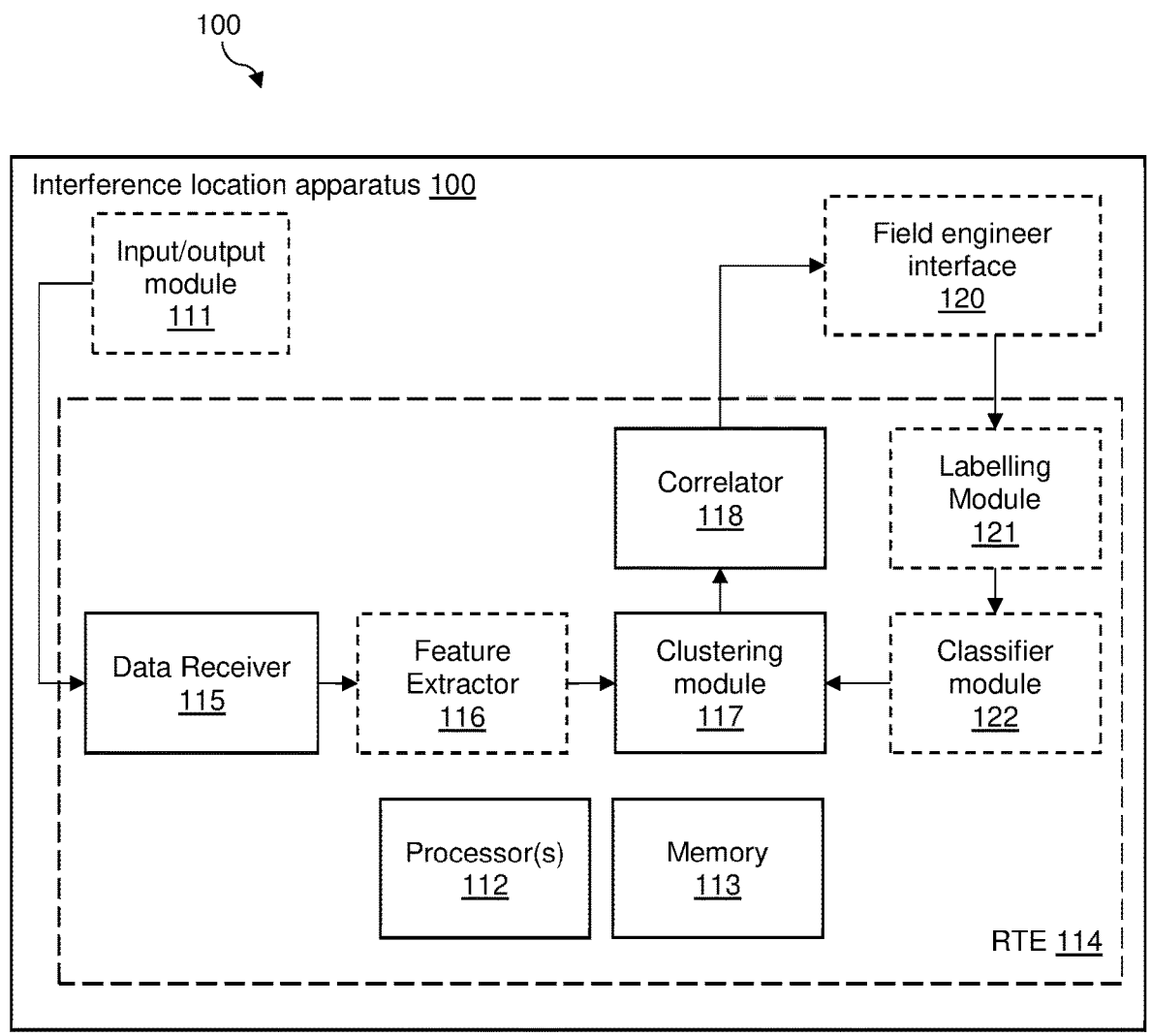
FIG. 2 shows a schematic representation of an interference location apparatus in accordance with examples of the present disclosure.

FIG. 2 shows in more detail an example interference location apparatus 100 used in conjunction with the communication network 150 as shown in FIG. 1.

The interference location apparatus 100 includes at least one processor 112, memory 113 and an input/output module 111 providing a communications interface for receiving data signals from at least the base stations of the RAN 151. A bus system (not shown) may be provided which supports communication between at the least one processor 112, memory 113 and input/output module 111.

The processor 112 executes instructions that can be loaded into memory 113. The processor 112 can include any suitable number(s) and type(s) of processors or other devices in any suitable arrangement. Example types of processor 112 include microprocessors, microcontrollers, digital signal processors, field programmable gate arrays and application specific integrated circuits.

The memory 113 may be provided by any structure(s) capable of storing and facilitating retrieval of information (such as data, program code, and/or other suitable information on a temporary or permanent basis). The memory 113 can represent a random access memory or any other suitable volatile or non-volatile storage device(s). The memory 113 may also contain one or more components or devices supporting longer-term storage of data, such as a read only memory, hard drive, flash memory, or optical disc, which may store software code for loading into the memory 113 at runtime. In use, the processor 112 and memory 113 provide a Runtime Environment (RTE) 114 in which instructions or code loaded into the memory 113 can be executed by the processor to generate instances of software modules in the Runtime Environment 114.

The memory 113 comprises instructions which, when executed by the one or more processors 112, cause the one or more processors 112 to instantiate a data receiver 115, a clustering module 117 and a correlator 118. In examples, the memory 113 may also comprise instructions which, when executed by the one or more processors 112, cause the one or more processors 112 to instantiate a feature extractor 116, a labelling module 121 and a classifier module 122 (all shown in dotted outlines to indicate that these features are in examples not provided). Together, the data receiver 115, feature extractor 116, clustering module 117 and correlator 118 may carry out the interference location method described in FIG. 3 to locate sources of potential interference in the cellular radio communications system 150. Similarly, the labelling module 121 and classifier module 122 may work together with the clustering module 117 and correlator 118 to carry out the interference classification method described in FIG. 4 to classify sources of potential interference in the cellular radio communications system 150.

Figure 3:
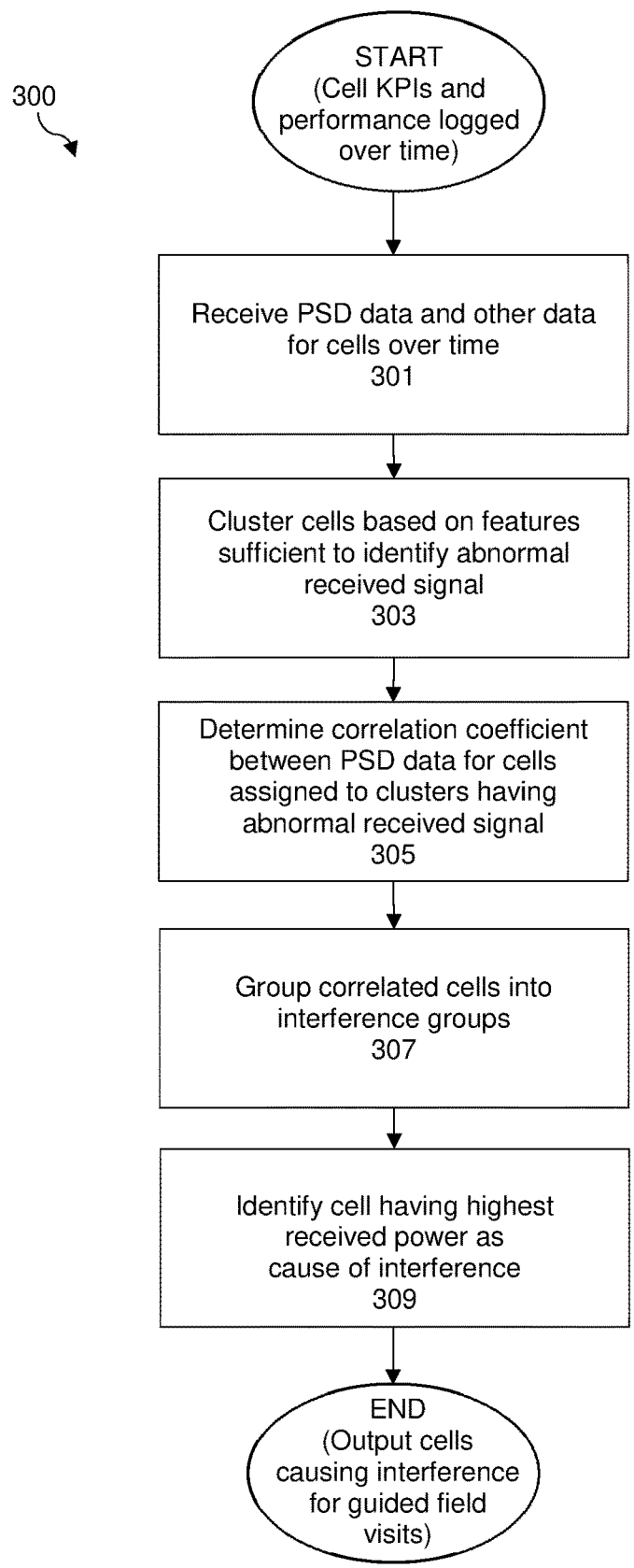
FIG. 3 shows a method of operation of an interference location apparatus in accordance with examples of the present disclosure to locate sources of potential interference in the cellular radio communications system.
Figure 4:
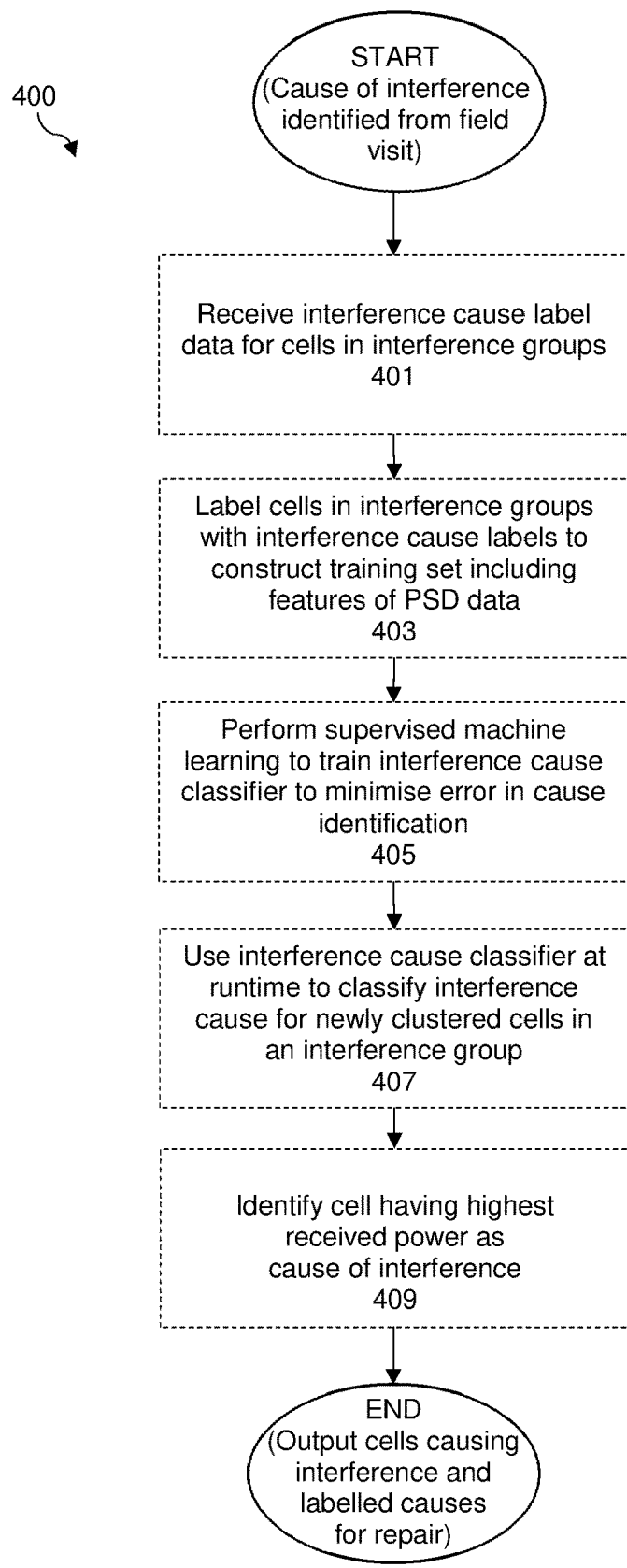
FIG. 4 shows another method of operation of an interference location apparatus in accordance with examples of the present disclosure to classify sources of potential interference in the cellular radio communications system.

Turning now to FIG. 3, the method 300 to locate sources of potential interference in the cellular radio communications system 150 is performed intermittently pursuant to the logging over time of various data by base stations of the RAN 151, including the Power Spectral Density (PSD) data and other data. This logging data about the base stations is received intermittently (such as by a periodic file transfer) or continuously as a data stream at the input/output module 111 of the interference location apparatus 100, where it is passed in step 301 to the data receiver 115. The data receiver 115 stores the data in memory 113 where it is periodically used to identify and locate sources of interference.

The input information received at the data receiver 115 may in examples include raw data representative of the PSD for the cells, key performance indicators provided by the cells, topology information for the cells, location information for the cells, orientation information for the cells, radio access technology, RAT, used by the cells, and radio resource allocation for the cells. For cells using having multi-element antenna arrays supporting determination of the angle of arrival of received signals, the input information received at the data receiver 115 may in examples further include the PSD data and angle of arrival split for each receive beam. For example, the cells may be provided by base stations that support Multiple-Input Multiple Output, MIMO, in their radio access technology. Such technologies utilise multi-element antenna arrays for beamforming, and as such can permit the determination of the angle of arrival of received signals.

In more detail, the data representative of the Power Spectral Density is PSD data of received power across different frequency bands of the base station. The PSD may be aggregated for a number days, and it may be generated as a snapshot or as an average of the raw PSD data over time intervals. The time intervals may be every 15 minutes, every hour, or any other suitable interval to characterise the development in the PSD signal over time as sources of interference may be introduced and persist, or be intermittent, over a matter of days or hours, and require observation over this timeframe to allow their detection, correlation and location. The PSD data for each base station is received over similar time intervals to allow the synchronisation of the data for the purposes of correlation. In examples, data representative of the Power Spectral Density may be raw PSD data provided by a base station, such as a UMTS-compliant eNodeB in a 3G RAT, or it may be similar data providing the same information, such as Received Interference Power (RIP) or Received Signal Strength Indicator (RSSI) provided per frequency band by an LTE-compliant eNodeB in a 4G RAT. In other embodiments, the raw PSD data may be generated by post-processing data provided by the base stations. In an example, the PSD data may be provided by the base stations as an average power for each frequency band (such as a resource block) taken every hour, giving, in the example, 96 records over four days, which are then analysed to identify the presence of interference sources. As noted above, for cells having multi-element antenna arrays supporting determination of the angle of arrival of received signals, the PSD data may be provided as PSD split per receiving beam and compute angle of arrival.

The KPI data may be provided as a stream over the same time period, although not necessarily over the same time intervals. The KPIs received may be those generated and reported by the base stations and may include underlying basic indicators that are typically affected by interference.

The additional information such as topology information, cell location, highlight, orientation, tilt, technology and frequency band and radio resource allocation may be more static, and may be provided only once or updated as necessary, rather than being continually provided as a stream.

These inputs may be used to accurately find the interference, and inputs are valid for all technologies utilising Wideband Code Division Multiple Access (WCDMA) and or Orthogonal Frequency Division Multiple Access (OFDMA), i.e. involving 3G, 4G & 5G technology.

Some or all of the received input data may be used by the clustering module 117 in the form it is received in by data receiver 115. In examples, a feature extractor 116 may be provided that processes the data received by the data receiver 115 to produce derived or extracted data for use by the clustering module 117 in clustering the cells.

The objective with the data collected by data receiver 115 and the extracted data generated by feature extractor 116 is to provide to the clustering module 117 data selected to characterise differences in the received PSD data and a normal received signal subject to potential interference to sufficiently generate clusters of cells in the resulting feature space that are identified as abnormal due to interference signals.

Figure 5:
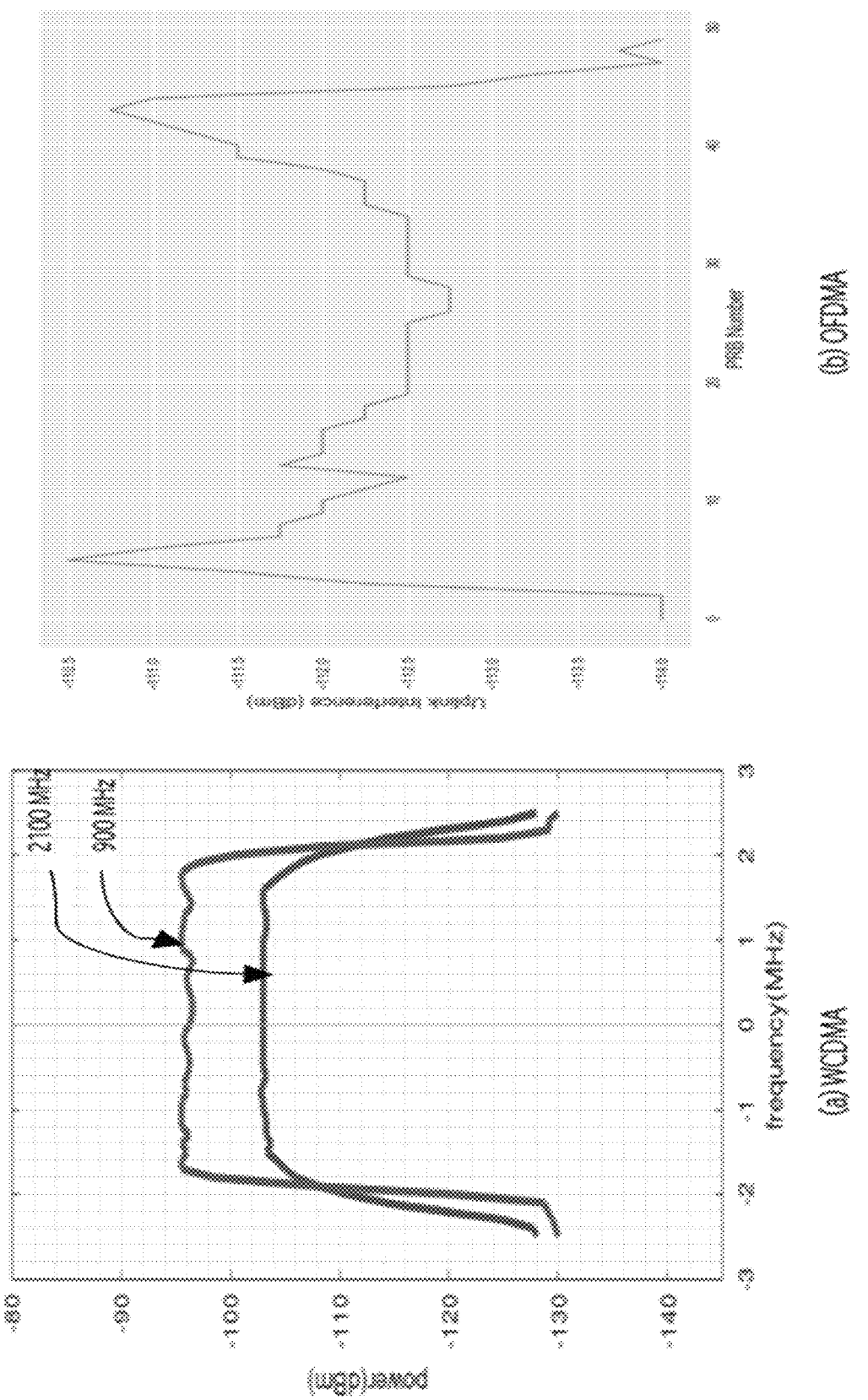
FIG. 5 shows plots of sample reference power spectral density, PSD, for normal received signal at base stations in, for the left pane, WCDMA systems in a UMTS network, and, for the right pane, OFDMA systems in an LTE network.

In this regard, FIG. 5 shows plots of sample reference power spectral density, PSD, for normal received signal at base stations in, for the left pane, WCDMA systems in a UMTS network, and, for the right pane, OFDMA systems in an LTE network. It can be noted in the left pane that, for WCDMA, there is a difference in PSD for the 900 MHz band compared to 2100 MHz band, and it arises from a use of specific filter for low band to allow allocation of GSM channels in the guard band. On the other hand, as can be seen in the right pane, the PSD of normal OFDMA received signal for LTE system exhibits a slightly high power towards edges of the curve arising from received power of control channels in the uplink. The features in the raw data and derived features extracted from the raw data are intended to be sufficient to capture statistics that distinguish abnormalities in received signal from the normal received signal data shown in FIG. 5.

In this respect, the feature extractor 116 may be designed to extract certain suitable features from the raw data, by feature engineering using expert knowledge, to detect, describe and classify distinctions between normal and abnormal received PSD data. Further, the features passed from the raw data and derived from the PSD data by feature extraction may be selected using feature selection to reduce the dimensionality and redundancy in the data to allow efficient computation of clusters.

An example set of suitable features extracted by feature extractor 116 for use in clustering is shown in FIG. 6. For example, the feature extractor 116 may derive from the raw PSD data for each cell captured over the analysis period values for the peak PSD, median PSD, peak-to-median ratio, minimum PSD, standard deviation of PSD, number of spikes in PSD and total width of spikes. The extracted features may be determined by feature extractor 116 for each time instance in the received PSD data. It has been found that, in embodiments, derived features such as those shown in FIG. 6 generate sufficient statistics, when combined with other data received for the cells (such as raw data and KPIs) to allow an unsupervised clustering module to generate clusters that distinguish cells having a normal received signal and cells having an abnormal received signal due to interference.

Figure 7:
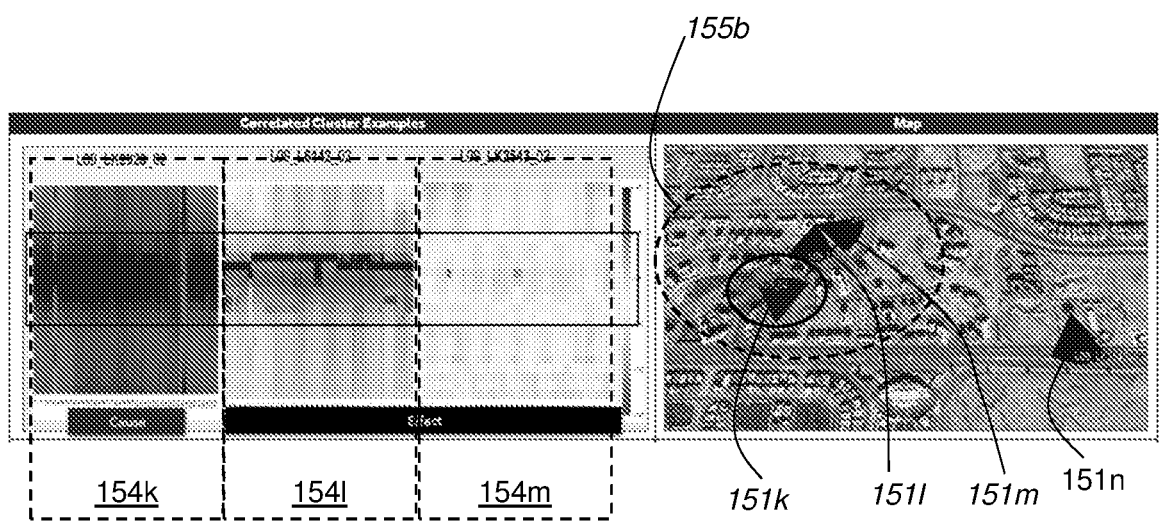
FIG. 7 shows, in the left pane, example spectrograms of PSD of signals received over four days for three cells clustered and correlated in an interference group and, in the right pain, a topological plat of the cells in the interference group together with an indication of the cell identified as containing the cause of the interference by a method in accordance with examples of the present disclosure.

Another approach to extracting features in feature extractor 116 to facilitate clustering without using feature engineering based on expert knowledge is to use unsupervised image recognition to recognise and describe features in spectrograms constructed of the raw PSD data for each cell. For example, FIG. 7 shows, in the left pane, example spectrograms 154$k$, 154$l$, 154$m$ of PSD of signals received over four days for three cells from base stations 151$k$, 151$l$, 151$m$ located proximate to each other in the region as shown in the map in the right pane. The spectrogram 154$k$, 154$l$, 154$m$ for each cell is shown by the boxed areas indicated with dashed lines. In the spectrograms, the pixels of the vertical dimension plot the frequency bands as, for example, PRBs of the radio resources used by the RAT provided by the cells, and the pixels of the horizontal dimension plot the time period (with the spectrograms 154$k$, 154$l$, 154$m$ being aligned in frequency and time for the different cells). The value for each pixel represents the power value of the received PSD for that frequency band and time interval, with the darker pixels showing a higher received power in that frequency band. This may be an absolute PSD value or a value normalised relative to the normal PSD value for that RAT and frequency band. The interference is visible in the frequency bands for each cell 151$k$, 151$l$, 151$m$ shown in the boxed area indicated with solid lines.

In these examples, the feature extractor 116 may apply an image recognition algorithm to the spectrograms 154$k$, 154$l$, 154$m$. In embodiments, the image recognition algorithm may be a neural network such as pre-trained image recognition algorithm (for example, ResNet50 or an autoencoder. The feature extractor 116 may extract values for clustering as the values generated from a hidden layer of the neural network providing the image recognition algorithm. In this way, the image recognition algorithm is used to automatically generate derived values having statistics representative of features of the spectrograms including features that allow the detection and description of different sources of interference. This approach allows features to be automatically detected and described for clustering that may not be known or adequately captured using features engineered and designed based on expert knowledge. In alternative embodiments, the unsupervised clustering may be performed on the spectrograms directly, using an appropriate image clustering algorithm, rather than on derived values generated by an image recognition algorithm providing a description of features in the spectrograms.

The approaches described above of extracting features based on expert knowledge and feature engineering, and on automatic extraction using image recognition techniques, are only provided as illustrative indications of suitable feature extraction approaches and are not intended to be exhaustive. Indeed, any suitable approach to feature extraction for the purposes of clustering cells having normal and abnormal received signal is intended to be within the scope of the present disclosure. Further, these approaches are not mutually exclusive and may in examples be used in conjunction to provide complementary derived features to further aid clustering.

The use of these data sources, in particular the raw data representative of the PSD and features extracted therefrom, allows the unsupervised clustering by the clustering module 117 to sufficiently cluster cells having abnormal received signal due to potential interference. In this regard, the features may be engineered to select features from the dataset received at data receiver 115, or process the received dataset, such as the raw PSD data, using the feature extractor 116 to derive values for extracted features, the raw or extracted features being selected to ensure that abnormalities in received PSD data are sufficiently described to allow their detection and partitioning through clustering.

In accordance with the method, appropriate features with statistics calculated in each time instance from PSD samples sufficient to characterise the PSD and capture the presence of interference sources compared to a 'normal' received signal, and other received data (e.g. KPIs and topology information) are passed in step 303 to the clustering module 117 to allow the cells to be clustered into a main body of cells exhibiting normal received signal (i.e. as expected) and cells exhibiting abnormal received signal indicative of the presence of interference from an interference source at or near the base station.

In step 303, the clustering module 117 combines the sufficient statistics captured in the raw and derived PSD features captured over time, and the other data such as KPIs, to cluster the cells into clusters. A number of possible clustering algorithms and approaches can be used to achieve useful results on a reasonable timescale of computation. For example, the clustering module 117 may implement a hierarchical clustering algorithm, such as a bottom-up approach to merge cells having similar locations in the resulting feature space.

Once the clustering algorithm has allocated or assigned the cells to clusters, these may be analysed in the feature space to identify clusters of cells exhibiting abnormal received signal compared to those exhibiting normal received signal, indicating the presence of interference. This assignment of clusters as normal and abnormal may be performed automatically by analysis of the distribution of cells in the different clusters (typically the 'normal' cluster(s) will contain relatively large numbers of cells, with the abnormal clusters with cells suffering from interference will contain relatively small numbers of cells). The performance KPIs may also be used to assign the clusters as abnormal. For example, by taking average numbers of the performance KPIs for the cells in each cluster, the clusters with degraded performance may be deemed abnormal. Further, the allocation of a cluster as abnormal may be checked and confirmed manually by a network engineer. In the example shown in FIG. 1, the cells labelled in italics associated with base stations 151a, 151c, 151d, 151e, 151f and 151j have been allocated to clusters indicated as giving an abnormal received signal, whereas the cells 151b, 151h, 151g and 151i have been allocated to clusters indicated as giving a normal received signal. In the example shown in FIG. 7, the cells labelled in italics associated with base stations 151k, 151l and 151m have been allocated to clusters indicated as giving an abnormal received signal, whereas the cell 151n has been allocated to clusters indicated as giving a normal received signal.

Once the cells have been clustered, in step 305, at least the received PSD data for the cells assigned to clusters indicated as having an abnormal received signal is passed from the clustering module 117 to the correlator 118. Then, for each cell assigned to a cluster having features indicative of an abnormal received signal, a matrix of the signal strength values in the received PSD data for that cell in the different frequency bands over the time intervals being monitored for correlation is constructed.

The PSD matrix PSD$_n$ for a cell n is two-dimensional, with rows representing PSD sample index, i.e. frequency domain (for example, with each index representing a Physical Resource Block 1 . . . F), while the columns represent the time samples (for example, for time intervals 1 . . . T) and the values of the matrix elements P$_{ij}$ represents the received signal. The matrix is constructed as follows:

$$PSD_n = \begin{matrix} p_{11} & p_{12} & \cdots & p_{1T} \\ p_{21} & \ddots & & \vdots \\ \vdots & & P_{ij} & \ddots & \vdots \\ p_{F1} & \cdots & & \cdots & p_{FT} \end{matrix}$$

Where P$_{ij}$ represents the received power at frequency i and time j, total number of frequency samples are represented by F, while total time samples are represented by T. This matrix is calculated for all cells in the RAN 151 assigned to abnormal clusters, where n represents the cell index.

Then, the correlator 118 determines a correlation coefficient between the matrix for each cell n and rest of cells m in the abnormal clusters where m=1 . . . N, m≠n. This is achieved by determining the is Pearson correlation coefficient. To reduce the number of computation requirements if needed, in examples, the correlation between PSD matrices for the cells can be performed only with other cells assigned to abnormal clusters within a threshold distance or geographic region of the cell.

In this way, cells exhibiting correlated abnormal received power disturbances at the same frequency bands at the same time intervals due to the same interference source will have a higher correlation score that cells not experiencing correlated interference signals.

Then, in step 307, the correlator 118 groups correlated cells with PSD matrices having a correlation coefficient above certain value or threshold into an interference group. That is, abnormal cells are grouped together into groups of cells which are identified as having correlated abnormal PSD matrices due to interference from the same source. In the example shown in FIG. 1, as the cells 151a, 151c, 151d, 151e and 151f are all experiencing the effects of interference from the satellite receiver 153, the correlator 118 determines that they have correlation coefficients between their PSD matrices above the threshold level, and so they are allocated into an interference group 155a. However, the other cell clustered as having an abnormal received signal, 151j, is not correlated with the cells 151a, 151c, 151d, 151e and 151f or any other cells, and it is placed into an interference group on its own. In the example shown in FIG. 7, as can be seen from the spectrograms 154k, 154l and 154m, the cells 151l, 151l and 151m are all experiencing the effects of interference from the same interference source, and so the correlator 118 determines that they have correlation coefficients between their PSD matrices above the threshold level, and so they are allocated into an interference group 155b. As can be seen from the examples shown in FIGS. 1 and 7, when located on a map, the cells allocated by the correlator 118 to an interference group are typically found to be geographically close to each other.

Then, to locate the source of the interference for each interference group, in step 309 the correlator 118 identifies the cell having the highest received power in a correlated frequency band as the cell causing or nearest that cause of the interference affecting the cells in the interference group. In the example shown in FIG. 1, the cell 151e has the highest received power, and so is deemed to be the cell causing or nearest that cause of the interference affecting the cells in the interference group 155a. As can be seen in the spectrogramhs 154k, 154l and 154m in the example shown in FIG. 7, the spectrogram 154k for the cell 151k has the highest received power, and so the cell 151k is deemed to be the cell causing or nearest that cause of the interference affecting the cells in the interference group 155b. The rest of cells in the interference groups 155a and 155b are receiving abnormal power spectral density as an effect of the interference source that is located at or near the cell deemed to contain the 'cause' of the interference.

To locate the source of the interference more exactly for cells using having multi-element antenna arrays supporting determination of the angle of arrival of received signals, such as those provided by base stations that support Multiple-Input Multiple Output, MIMO, in their radio access technology, the correlator 118 uses the PSD data split per receive beam to identify the receive beam causing the interference. The correlator 118 then uses the computed angle of arrival of that receive beam to identify the direction from which the interference is originating.

For interference groups containing only a single cell, such as the cell 151j, the correlator 118 identifies that the cause of the interference is deemed to be a fault within the receiver at the cell. That is, the interference is caused by a fault in the base station itself, and it is deemed to not be propagating to other cells in the network.

Once the correlator 118 has identified the cells as the 'cause' in each interference group, (i.e. those cells located at or near the interference source affecting the interference group), these cells are output by the correlator to a field engineer interface 120. The field engineer interface 120 may be any suitable interface through which field engineers receive reports locating interference sources provided by the interference location apparatus 100. For example, the field engineer interface 120 may be an API receiving calls and data from a field engineer system for maintaining the RAN 151, or the field engineer interface 120 may be a report provided periodically on a web-based user interface. The reports provided by the field engineer interface 120 may enable the field engineers to perform targeted and pro-active investigations, facilitating the early location and removal or repair of the interference source, enabling high levels of connectivity to be maintained using the network's radio resources. Accordingly, field engineer interface 120 directs engineer field visits toward the cells that are classified as cause or near cause of interference, hence number of visited cells together with search radius can be significantly reduced. The localisation and field search is further aided if a compute angle of arrival for the interference is known from a base station having multi-element antenna arrays supporting determination of the angle of arrival of received signals, or if the interference is deemed to be non-propagating and resulting from a fault in an individual base station itself.

Cells causing or near an interference source are visited by, where the visit is guided by the reports from the interference location apparatus 100, for which the potential location of the interferences source is estimated from correlating the affected cells with coverage maps. As a result, finding interference sources early and fixing them is relatively easy.

For example, rather than each of base stations 151a, 151c, 151d, 151e and 151f as shown in FIG. 1 separately reporting connectivity problems requiring separate field engineer visits and investigations, a field engineer may be directed straight to base station 151e, following or even before connectivity problems are reported, as it is known from interference location apparatus 100 operating the method 300 that the cause of the interference if located at or near the base station 151e. In this way the satellite receiver 153 can be quickly located and addressed, recovering connectivity for the cells in the interference group 155a.

In the field, the engineers may locate the interference source more accurately using a digital spectrum analyser combined with the correlator information output at the interference location apparatus 100. That is, the spectrum analyser may receive a time domain signal in the field and then utilise a Fast Fourier Transform (FFT) in order to compute PSD at the location of the spectrum analyser. By comparing this with a PSD provided from the base station receiver reported by the interference location apparatus 100, the direction to the interference source can be found, using, for example, a directional antenna attached to the spectrum analyser.

Once the guided field visits have located and identified the source of the interference, information on the type of interference source may be fed back into the interference location apparatus 100 via, for example, the field engineer interface 120, and this can be used to build a classifier to train in the interference location apparatus 100 a classifier for automatic classification of interference sources in interference groups, to aid the faster identification and repair of interference sources in future. This will be explained now with reference to FIG. 4, which shows a method 400 of operation of interference location apparatus 100 in accordance with examples of the present disclosure to classify sources of potential interference in the cellular radio communications system. As the method 400 are not needed to locate the interference source (which can be located using the method 300 shown in FIG. 3), the steps 401, 403, 405, 407 and 409 are indicated by dotted lines in FIG. 4, which may optionally be used to aid early classification of the cause of interference in interference groups, even before a field engineer has investigated the source of the interference, allowing the investigations and repair to be better directed.

In step 401, once the cause of the interference has been identified for an interference group by a field engineer conducting a field visit, the interference location apparatus 100 may receive interference cause label data for the interference group. The interference cause label data may, for example, be input by the field engineer using field engineer interface 120.

The interference cause label data may then be passed to labelling module 121 which, in step 403, may label the cells in the interference groups (i.e. the features of the received PSD data for those cells) to construct a training set for training a classifier to learn the features of the features of the abnormal received PSD data associated with the interference source that is causing those features. For example, the labels for the interference causes can be can take the value describing any potential cause of interference, such as passive intermodulation, external interference, faulty repeater, faulty base station, etc.

The labelled training set may then be passed to the classifier module 122, which in step 405 performs supervised machine learning to train an interference cause classifier to classify interference cause for newly clustered cells in an interference group.

The classifier may be a decision tree classifier, or an artificial neural network. The classifier may adopt a maximum likelihood approach to assigning the cause. The classifier module 122 may train the classifier by using an optimisation algorithm to seek to minimise a loss function characterising an error between input labelled causes and output classified causes for training data comprising features of the received PSD data for cells in an interference group. Where the classifier is a neural network, the training of the weights of the nodes of the neural network to minimise the loss function results in a classifier that, for new instances of PSD data for cells in an interference group, can classify the cause of the interference with a low error rate between the predicted cause and the determined cause.

Thus, following the training of the classifier in step 405, at runtime, in step 407, the classifier module 122 may use the trained interference cause classifier to classify, based on received PSD data for cells in a newly clustered, non-labelled interference group, the likely cause of interference in the cells of the interference group. In this way, once the interference location apparatus 100 has collected sufficient data through analysis of received PSD data and other data, together with labelled causes from field engineers, the interference location apparatus 100 may cluster cells into normal and abnormal received signals by clustering (as described in relation to the method 300), and for newly identified interference groups, use the classifier in step 407 to classify the likely cause of the interference, and determine in step 409, the cell having the highest received power as the cause of the interference. This may further reduce the need for field visits, where, knowing the location and cause of the interference from the clustering and classification steps, the cells and means for potential fixing of the interference can be notified to field engineers in advance of any visits. In some cases, the need for visits may be removed completely, for example, where a third party is responsible for the identified cause of the interference, they can be notified and requested to remove the interference without the need for field investigations.

The approaches described above in relation to FIGS. 3, 6 and 7 of extracting features based on expert knowledge and feature engineering, and on automatic extraction using image recognition techniques, are only provided as illustrative indications of suitable feature extraction approaches and are not intended to be exhaustive. Indeed, any suitable approach to feature extraction for the purposes of clustering cells having normal and abnormal received signal is intended to be within the scope of the present disclosure. Further, these approaches are not mutually exclusive and may in examples be used in conjunction to provide complementary derived features to further aid clustering.

For example, the approach described in relation to FIG. 6 of using extracted features to provide sufficient statistics may be used in a first stage to allow a hierarchical clustering algorithm to separate out clusters of cells having normal and abnormal received signal. This can be computationally efficient way of reducing down the number of cells in the data to identify those subject to interference. However, the use of extracted features as described in relation to FIG. 6 may not be able to separate out cells into clusters, particularly in a way that enables different sources of interference to be easily identified in a classification process. Indeed, using the approach described in relation to FIG. 6 can effectively enable a low dimensionality approach to a broad clustering between normal and abnormal clusters that can then reduce the problem space (i.e. by reducing the number of cells) for a further, more detailed, clustering analysis to subsequently be performed on the cells in the initial abnormal cluster. For example, a subsequent clustering step using the image-based clustering described in relation to FIG. 7, in which features characterising the PSD are extracted from spectrograms of the cells, can allow separation of the abnormal cells into finer clusters which can better differentiate between, for example, different causes of interference that then enable classification. In this example, with reference to the methods of FIGS. 3 and 4, a further clustering step may thus be provided after the first clustering step 303. For example, the second, image-based clustering step may be performed before or after the correlation step 307. Indeed, the method 300 may be performed twice, the second time using an image-based clustering approach as described in relation to FIG. 7 to further cluster large clusters of cells marked abnormal.

Using an image-based clustering approach as described in relation to FIG. 7, in which image recognition algorithms are used to extract features from spectrograms, is significantly more computationally intensive than using the approach described in relation to FIG. 6. Thus, using a two-step clustering approach in this way to first identify broader clusters of abnormal cells using the approach described in relation to FIG. 6, reduces down the amount of data that can then be subject to a second, more computationally intensive clustering step using the approach described in relation to FIG. 7 to separate out the abnormal cells into clusters suffering different causes of interference. This permits a computationally efficient approach to identifying and locating sources of potential interference. Further, using this two-step approach to clustering allows more accurate labelling of the causes of interference in the clusters, which can improve the accuracy of a classifier trained based on the labelled data using the method 400 described in relation to FIG. 4.

Regarding the Radio Access Technologies to which the methods 300 and 400 can be applied to locate and identify sources of interference, these approaches are effective not just in relation to widespread network technologies including, for example, UMTS and LTE, but they have been found to be effective in particular for emerging network technologies including 5G NR, in which the number of cells has increased significantly with the adoption of small cells and relays, and thus in which the possible picture of interference sources can become increasingly complex.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

The invention claimed is:

1. A method for locating sources of potential interference in frequency bands of carrier signals used by cells of a plurality of base stations of a cellular radio communication system, the method comprising:
receiving data representative of power spectral density, PSD, in carrier signals across a plurality of frequency bands received at the plurality of base stations for the cells of the cellular radio communication system over time intervals;
clustering the cells based on features of the received PSD data that distinguish between a normal received signal and an abnormal received signal subject to potential interference;
for each cell assigned to a cluster having features indicative of an abnormal received signal, determining a correlation coefficient between a matrix of the signal strength values in the received PSD data for the respective cell in the different frequency bands over the time intervals and the signal strength values in the received PSD data for all other cells in the cluster in the plurality of frequency bands over the same time intervals;
grouping cells having correlation coefficients above a threshold value as being members of interference groups;
for each interference group, identifying the cell having the highest received power in a correlated frequency band as the cell causing or nearest a cause of the interference affecting the cells in the interference group.

2. The method of claim 1, wherein the features of the received PSD data used to cluster the cells includes one or more of:
raw data representative of the PSD for the cells;
features extracted as values derived from the raw data representative of the PSD for the cells;
key performance indicators provided by the cells;
topology information for the cells;
location information for the cells;
orientation information for the cells;
radio access technology, RAT, used by the cells; and
radio resource allocation for the cells.

3. The method of claim 1, wherein the features of the received PSD data used to cluster the cells are selected to characterize differences between the received PSD data and a normal received signal subject to potential interference to generate clusters of cells in the resulting feature space that are identified as abnormal due to interference signals.

4. The method of claim 1, wherein the clustering of the cells comprises performing a hierarchical clustering on the features of the received PSD data plotted in a feature space.

5. The method of claim 1, wherein the clustering of the cells comprises applying an image recognition algorithm to spectrograms representative of received raw data representative of the PSD for the cells over time.

6. The method of claim 5, wherein the image recognition algorithm is a neural network and wherein the clustering of the cells further comprises applying a clustering algorithm to values extracted from a hidden layer of the neural network comprising the image recognition algorithm.

7. The method of claim 5, wherein the clustering of the cells comprises a first clustering step and a second clustering step, wherein the applying of an image recognition algorithm to spectrograms representative of the received raw data representative of the PSD for the cells over time is performed for the second clustering step.

8. The method of claim 1, further comprising identifying a cluster of cells having features indicative of an abnormal received signal by:
comparing one or more of:
key performance indicators provided by the cells in the cluster; and mean values of features extracted as values derived from raw data representative of the PSD for the cells in the cluster;
with one or more of:
key performance indicators for cells within the bounds of normal operation; values of features representative of the PSD for a normal received signal for the cells in the cluster.

9. The method of claim 1, further comprising:
receiving interference cause label data for interference groups resulting from a field visit to identify the cause of the interference; and
performing supervised machine learning to train an interference cause classifier by using an optimization algorithm to seek to minimise a loss function characterizing an error between input labelled causes and output classified causes for training data comprising features of the received PSD data for cells in an interference group.

10. The method of claim 1, further comprising:
using an interference cause classifier to classify, based on received PSD data for cells in a newly clustered, non-labelled interference group, the likely cause of interference in the cells of the interference group.

11. The method of claim 1, further comprising, for each interference group, outputting data representative of the cell identified as causing or nearest the cause of the interference group, for guiding targeted field visits to those cells.

12. The method of claim 1, wherein in the determination of a correlation coefficient for each cell assigned to a cluster having features indicative of an abnormal received signal, the each cell is correlated only with other cells assigned to abnormal clusters within a threshold distance or geographic region of the each cell.

13. The method of claim 1, wherein, for cells having multi-element antenna arrays supporting determination of the angle of arrival of received signals, the method further comprises receiving the PSD data and angle of arrival respectively split for each receive beam, and for cells allocated to abnormal clusters and identified as causing or nearest the cause of the interference, using the split PSD data to identify the receive beam causing the interference, and using the split angle of arrival to identify the direction from which the interference is originating.

14. The method of claim 1, wherein for interference groups containing only a single cell, the cause of the interference is deemed to be a fault within a receiver at the single cell, wherein the fault is not propagating to other cells in the cellular radio communication system.

15. An apparatus for locating sources of potential interference in carrier frequency bands used by cells of a plurality of base stations of a cellular radio communication system, the apparatus comprising:
one or more processors;
memory comprising instructions which when executed configure the one or more processors to:

receive data representative of power spectral density, PSD, in carrier signals across a plurality of frequency bands received at the plurality of base stations for the cells of the cellular radio communication system over time intervals;

cluster the cells based on features of the received PSD data that distinguish between a normal received signal and an abnormal received signal subject to potential interference;

for each cell assigned to a cluster having features indicative of an abnormal received signal, determine a correlation coefficient between a matrix of the signal strength values in the received PSD data for the respective cell in the different frequency bands over the time intervals and the signal strength values in the received PSD data for all other cells in the cluster in the plurality of frequency bands over the same time intervals;

group cells having correlation coefficients above a threshold value as being members of interference groups;

for each interference group, identify the cell having the highest received power in a correlated frequency band as the cell causing or nearest a cause of the interference affecting the cells in the interference group.

16. A non-transitory computer readable medium comprising instructions which when executed by one or more processors, configure the one or more processors to carry out the method of claim 1.

\* \* \* \* \*